United States Patent
Soh

(10) Patent No.: US 11,493,954 B2
(45) Date of Patent: Nov. 8, 2022

(54) FOLDABLE DISPLAY DEVICE

(71) Applicant: SAMSUNG DISPLAY CO., LTD., Yongin-si (KR)

(72) Inventor: Yong Kwon Soh, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 120 days.

(21) Appl. No.: 17/024,674

(22) Filed: Sep. 17, 2020

(65) Prior Publication Data

US 2021/0103313 A1     Apr. 8, 2021

(30) Foreign Application Priority Data

Oct. 8, 2019     (KR) ........................ 10-2019-0124754

(51) Int. Cl.
*G06F 1/16*     (2006.01)

(52) U.S. Cl.
CPC .......... *G06F 1/1616* (2013.01); *G06F 1/1652* (2013.01); *G06F 1/1656* (2013.01); *G06F 1/1681* (2013.01)

(58) Field of Classification Search
CPC .... G06F 1/1616; G06F 1/1652; G06F 1/1656; G06F 1/1681
See application file for complete search history.

(56) References Cited

U.S. PATENT DOCUMENTS

| | | | |
|---|---|---|---|
| 9,348,450 B1* | 5/2016 | Kim | G06F 1/1616 |
| 9,964,995 B1 | 5/2018 | Morrison et al. | |
| 10,761,572 B1* | 9/2020 | Siddiqui | G06F 1/1681 |
| 2016/0155788 A1* | 6/2016 | Kwon | H01L 51/0097 257/40 |
| 2017/0060188 A1* | 3/2017 | Han | G06F 1/1641 |
| 2017/0115701 A1* | 4/2017 | Bae | G06F 1/16 |
| 2017/0123455 A1* | 5/2017 | Park | G06F 1/1616 |
| 2020/0371553 A1* | 11/2020 | Hsu | G06F 1/1624 |
| 2020/0409429 A1* | 12/2020 | Hsu | G06F 1/1616 |
| 2022/0068167 A1* | 3/2022 | Park | G06F 1/1616 |

FOREIGN PATENT DOCUMENTS

| | | |
|---|---|---|
| KR | 1020150130652 | 11/2015 |
| TW | M575877 | 3/2019 |

OTHER PUBLICATIONS

Extended European Search Reported dated Mar. 4, 2021 for European Application No. 20198852.4.

* cited by examiner

*Primary Examiner* — Anthony Q Edwards
(74) *Attorney, Agent, or Firm* — F. Chau & Associates, LLC

(57) ABSTRACT

A display device includes a display module, a case with a first cover, a second cover and a coupling cover, a first metal plate disposed between the display module and the case that includes a first fixed portion and a first rotatable portion, a second metal plate disposed between the display module and the case that includes a second fixed portion and a second rotatable portion, a first hinge rotatably connected to the coupling cover that includes a first fixed support portion that supports the first fixed portion and a first portion that supports the first or second rotatable portion according to rotation of the first cover, and a second binge rotatably connected to the coupling cover and including a second fixed support portion that supports the second fixed portion and a second portion that supports the first or second rotatable portion according to rotation of the second cover.

21 Claims, 12 Drawing Sheets

FOLDABLE DISPLAY DEVICE

CROSS-REFERENCE TO RELATED APPLICATION(S)

This application claims priority under 35 USC § 119 from, and the benefit of, Korean Patent Application No. 10-2019-0124754, filed on Oct. 8, 2019 in the Korean Intellectual Property Office (KIPO), the contents of which are herein incorporated by reference in their entirety.

BACKGROUND

1. Technical Field

Embodiments are directed to a display device. More particularly, embodiments are directed to a foldable display device.

2. Description of the Related Art

A display device provides information to a user by displaying an image. Recently, a flexible display device that can be deformed in various ways has been developed. Unlike a flat panel display, a flexible display device can be folded, bent, or rolled like paper. A flexible display device is portable and can provide a more convenient user experience.

SUMMARY

Embodiments provide a foldable display device that includes an inner space in which additional structures can be disposed.

A foldable display device according to embodiments includes a flexible display module that includes a first non-foldable portion, a second non-foldable portion, and a foldable portion disposed between the first non-foldable portion and the second non-foldable portion, a case disposed on the flexible display module and that includes a first cover that covers the first non-foldable portion, a second cover that covers the second non-foldable portion, and a coupling cover that covers the foldable portion, a first metal plate disposed between the flexible display module and the case and that includes a first fixed portion that supports the first non-foldable portion and a first rotatable portion that supports the foldable portion adjacent to the first non-foldable portion, a second metal plate disposed between the flexible display module and the case and that includes a second fixed portion that supports the second non-foldable portion and a second rotatable portion that supports the foldable portion adjacent to the second non-foldable portion, a first hinge rotatably connected to the coupling cover and that includes a first fixed support portion that supports the first fixed portion and a first portion that supports the second rotatable portion or the first rotatable portion according to a rotation of the first cover, and a second hinge rotatably connected to the coupling cover and that includes a second fixed support portion that supports the second fixed portion and a second portion that supports the first rotatable portion or the second rotatable portion according to a rotation of the second cover.

In an embodiment, the first portion of the first hinge further includes a first non-fixed support portion spaced apart from the first fixed support portion and that supports the second rotatable portion when the flexible display module is unfolded, and the second portion of the second hinge further includes a second non-fixed support portion spaced apart from the second fixed support portion and that supports the first rotatable portion when the flexible display module is unfolded.

In an embodiment, the first fixed support portion and the first non-fixed support portion are aligned on substantially the same plane, and the second fixed support portion and the second non-fixed support portion are aligned on substantially the same plane.

In an embodiment, a width of the first fixed support portion is greater than a width of the first non-fixed support portion, and a width of the second fixed support portion is greater than a width of the second non-fixed support portion.

In an embodiment, the first portion of the first hinge further includes a first straight portion adjacent to the first fixed support portion and that supports the first rotatable portion when the flexible display module is folded, and the second portion of the second hinge further includes a second straight portion adjacent to the second fixed support portion and that supports the second rotatable portion when the flexible display module is folded.

In an embodiment, the first straight portion forms an obtuse angle with the first fixed support portion, and the second straight portion forms an obtuse angle with the second fixed support portion.

In an embodiment, the first portion of the first hinge further includes a first curved portion disposed between the first non-fixed support portion and the first straight portion and that is slidably and rotatably connected to the coupling cover, and the second portion of the second hinge further includes a second curved portion disposed between the second non-fixed support portion and the second straight portion and that is slidably and rotatably connected to the coupling cover.

In an embodiment, the first non-fixed support portion forms an acute angle with the first curved portion, and the second non-fixed support portion forms an acute angle with the second curved portion.

In an embodiment, the first straight portion forms an obtuse angle with the first curved portion, and the second straight portion forms an obtuse angle with the second curved portion.

In an embodiment, when the flexible display module is unfolded, a first end of the coupling cover is positioned between the first straight portion and the first curved portion and a second end of the coupling cover is positioned between the second straight portion and the second curved portion.

In an embodiment, the coupling cover includes a first coupling portion that is slidably and rotatably connected to the first curved portion and a second coupling portion that is slidably and rotatably connected to the second curved portion. When the flexible display module is folded, the first coupling portion of the coupling cover is positioned between the first non-fixed support portion and the first curved portion and the second coupling portion of the coupling cover is positioned between the second non-fixed support portion and the second curved portion.

In an embodiment, each of a curvature of the first curved portion and a curvature of the second curved portion is greater than a curvature of the coupling cover.

In an embodiment, when the flexible display module is unfolded, the first rotatable portion is collinear with the first fixed portion and the second rotatable portion is collinear with the second fixed portion. When the flexible display module is folded, the first rotatable portion forms an obtuse angle with the first fixed portion and the second rotatable portion forms obtuse angle with the second fixed portion.

In an embodiment, each of the first hinge and the second hinge may have a uniform thickness, and each of the first hinge and the second hinge may include a metal.

In an embodiment, the foldable display device further includes a protective layer coupled between the first metal plate and the second metal plate and that covers the foldable portion of the flexible display module exposed between the first metal plate and the second metal plate.

A foldable display device according to embodiments includes a flexible display module that includes a first non-foldable portion, a second non-foldable portion, and a foldable portion disposed between the first non-foldable portion and the second non-foldable portion, a case disposed on the flexible display module and that includes a first cover that covers the first non-foldable portion, a second cover that covers the second non-foldable portion, and a coupling cover that covers the foldable portion and includes a first coupling portion and a second coupling portion, a first metal plate disposed between the flexible display module and the case and that supports the first non-foldable portion and the foldable portion adjacent to the first non-foldable portion, a second metal plate disposed between the flexible display module and the case and that supports the second non-foldable portion and the foldable portion adjacent to the second non-foldable portion, a first hinge slidably and rotatably connected to the first coupling portion of the coupling cover and that supports the first metal plate, and a second hinge slidably and rotatably connected to the second coupling portion of the coupling cover and that supports the second metal plate.

In an embodiment, the first metal plate includes a first fixed portion that supports the first non-foldable portion and a first rotatable portion that supports the foldable portion adjacent to the first non-foldable portion, and the second metal plate includes a second fixed portion that supports the second non-foldable portion and a second rotatable portion that supports the foldable portion adjacent to the second non-foldable portion.

In an embodiment, the first hinge includes a first fixed support portion that supports the first fixed portion, a first non-fixed support portion spaced apart from the first fixed support portion and that supports the second rotatable portion when the flexible display module is unfolded, a first straight portion adjacent to the first fixed support portion and that supports the first rotatable portion when the flexible display module is folded, and a first curved portion disposed between the first non-fixed support portion and the first straight portion and that is slidably and rotatably connected to the first coupling portion of the coupling cover.

In an embodiment, the second hinge includes a second fixed support portion that supports the second fixed portion, a second non-fixed support portion spaced apart from the second fixed support portion and that supports the first rotatable portion when the flexible display module is unfolded, a second straight portion adjacent to the second fixed support portion and that supports the second rotatable portion when the flexible display module is folded, and a second curved portion disposed between the second non-fixed support portion and the second straight portion and that is slidably and rotatably connected to the second coupling portion of the coupling cover.

A foldable display device according to embodiments includes a flexible display module that includes a first non-foldable portion, a second non-foldable portion, and a foldable portion disposed between the first non-foldable portion and the second non-foldable portion; a case disposed on the flexible display module and that includes a first cover that covers the first non-foldable portion, a second cover that covers the second non-foldable portion, and a coupling cover that covers the foldable portion; a first metal plate disposed between the flexible display module and the case and that includes a first fixed portion that supports the first non-foldable portion and a first rotatable portion that supports the foldable portion adjacent to the first non-foldable portion; a second metal plate disposed between the flexible display module and the case and that includes a second fixed portion that supports the second non-foldable portion and a second rotatable portion that supports the foldable portion adjacent to the second non-foldable portion; a protective layer coupled between the first metal plate and the second metal plate and that covers the foldable portion of the flexible display module exposed between the first metal plate and the second metal plate; a first hinge slidably and rotatably connected to the coupling cover and that supports the first metal plate; and a second hinge slidably and rotatably connected to the coupling cover and that supports the second metal plate.

In an embodiment, the first hinge includes a first fixed support portion that supports the first fixed portion and a first portion that supports the second rotatable portion or the first rotatable portion according to a rotation of the first cover; and the second hinge includes a second fixed support portion that supports the second fixed portion and a second portion that supports the first rotatable portion or the second rotatable portion according to a rotation of the second cover.

In a foldable display device according to embodiments, the first hinge and the second hinge support the first metal layer and the second metal layer, and are slidably and rotatably connected to the first coupling portion and the second coupling portion of the coupling cover, respectively. Accordingly, the first metal plate and the second plate can be supported when the flexible display module is unfolded or folded, and a space is provided inside the coupling cover in which additional structures can be disposed.

DETAILED DESCRIPTION OF EXEMPLARY EMBODIMENTS

Hereinafter, foldable display devices in accordance with exemplary embodiments will be explained in detail with reference to the accompanying drawings.

Figure 1:
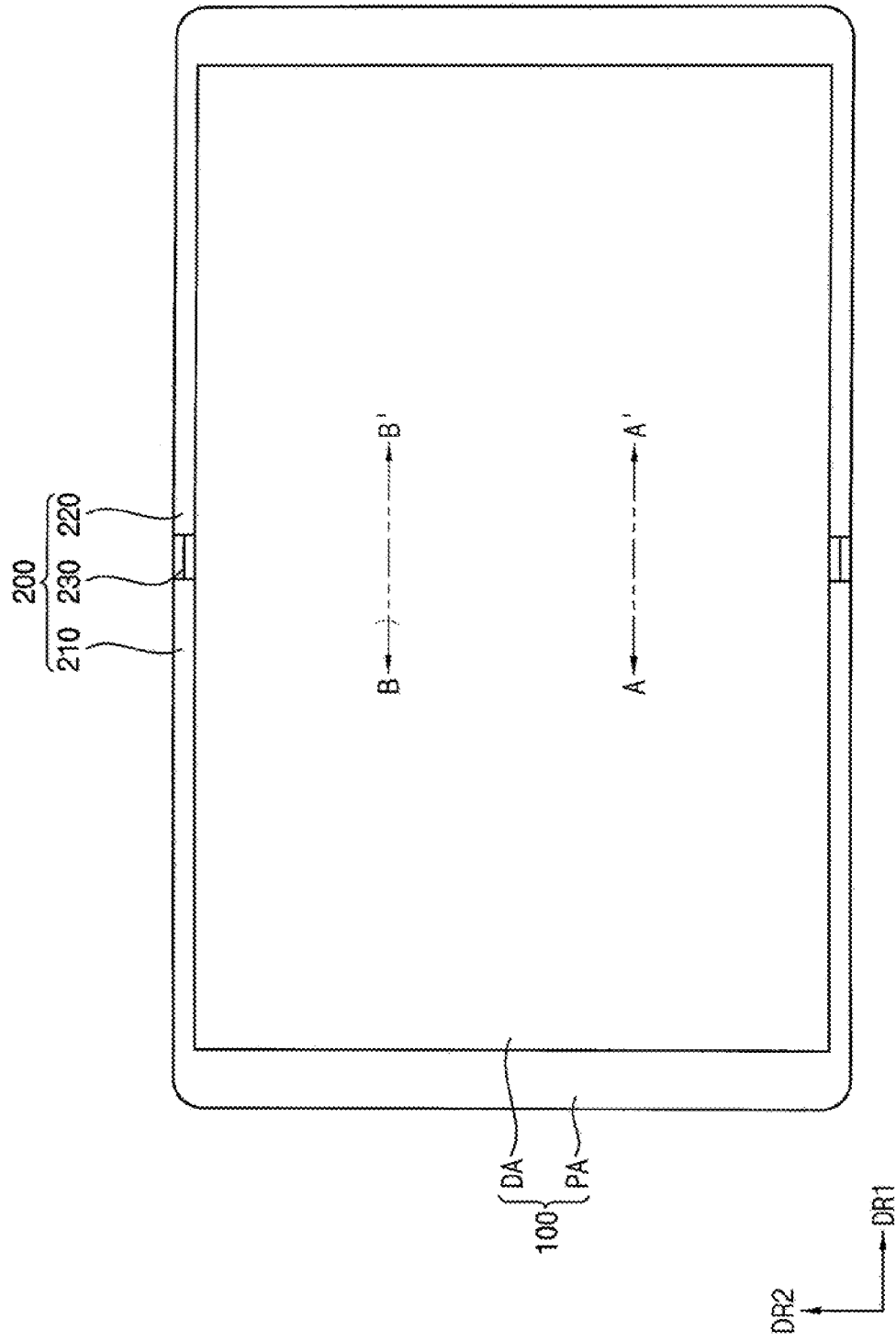
FIG. 1 is a plan view of an unfolded state of a foldable display device according to one embodiment of the present disclosure.
Figure 2:
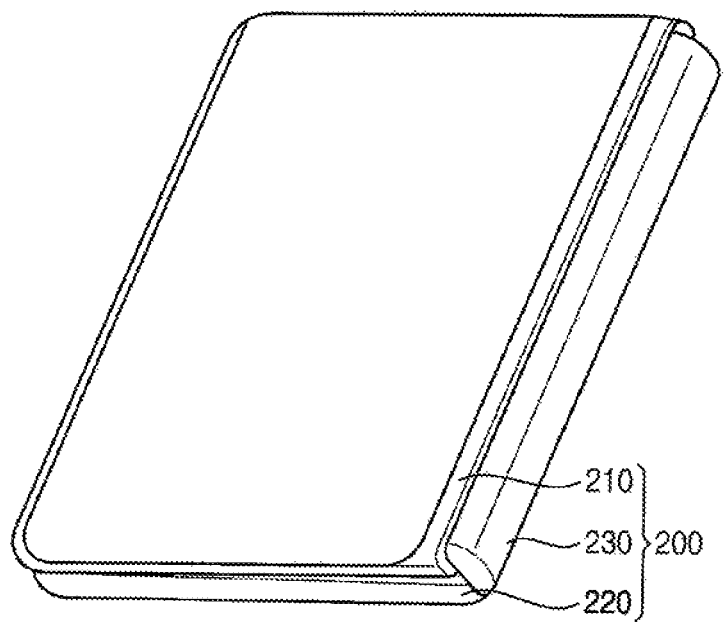
FIG. 2 is a perspective view of a folded state of a foldable display device of FIG. 1.

FIG. 1 is a plan view of an unfolded state of a foldable display device according to one embodiment of the present disclosure. FIG. 2 is a perspective view of a folded state of a foldable display device of FIG. 1.

Referring to FIGS. 1 and 2, a foldable display device according to an embodiment of the present disclosure includes a flexible display module 100 and a case 200.

According to an embodiment, the flexible display module 100 includes a display area DA and a peripheral area PA. The display area DA can display an image, and the peripheral area PA surrounds the display area PA and forms a bezel of the foldable display device.

According to an embodiment, the flexible display module 100 includes a flexible substrate that includes flexible plastic, etc., instead of a rigid substrate that includes rigid glass, etc. Accordingly, the flexible display module 100 can be folded or unfolded freely within a predetermined range. The flexible display module 100 is supported to be folded or unfolded by the case 200.

According to an embodiment, the case 200 includes a first cover 210, a second cover 220, and a coupling cover 230. The coupling cover 230 is disposed between the first cover 210 and the second cover 220, and the first cover 210 and the second cover 220 are rotatably coupled to the coupling cover 230 with the coupling cover 230 in between. The second cover 220 is positioned in a first direction DR1 from the first cover 210 with the coupling cover 230 in between.

Figure 3:
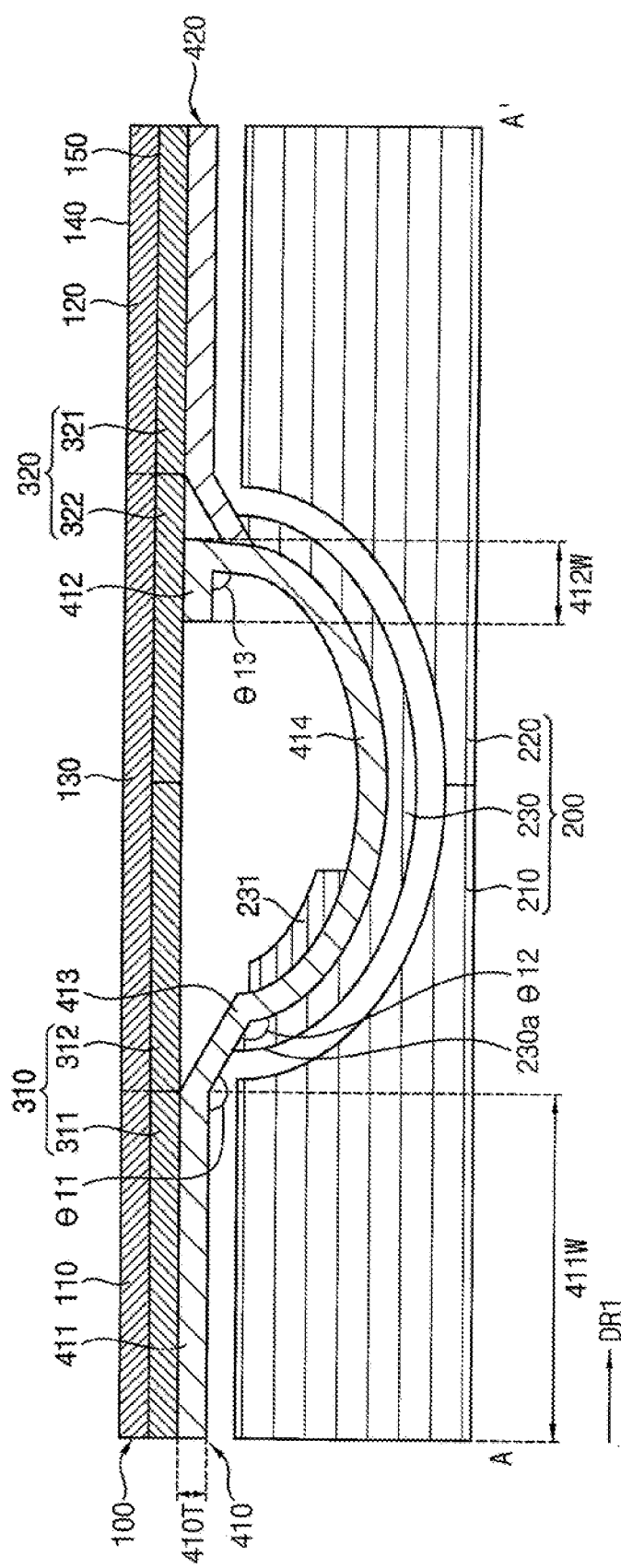
FIG. 3 is a cross-sectional view of a foldable display device taken along a line A-A' of FIG. 1.
Figure 4:
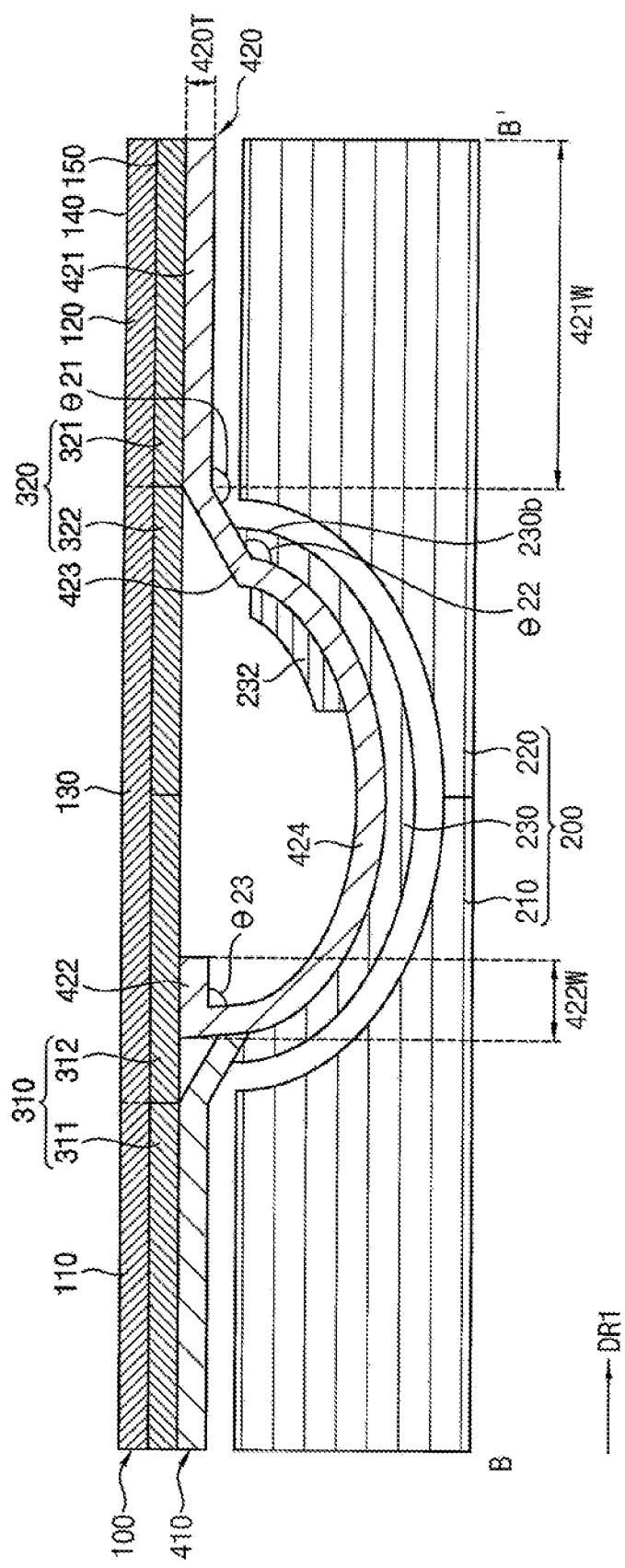
FIG. 4 is a cross-sectional view of a foldable display device taken along a line B-B' of FIG. 1.
Figure 5:
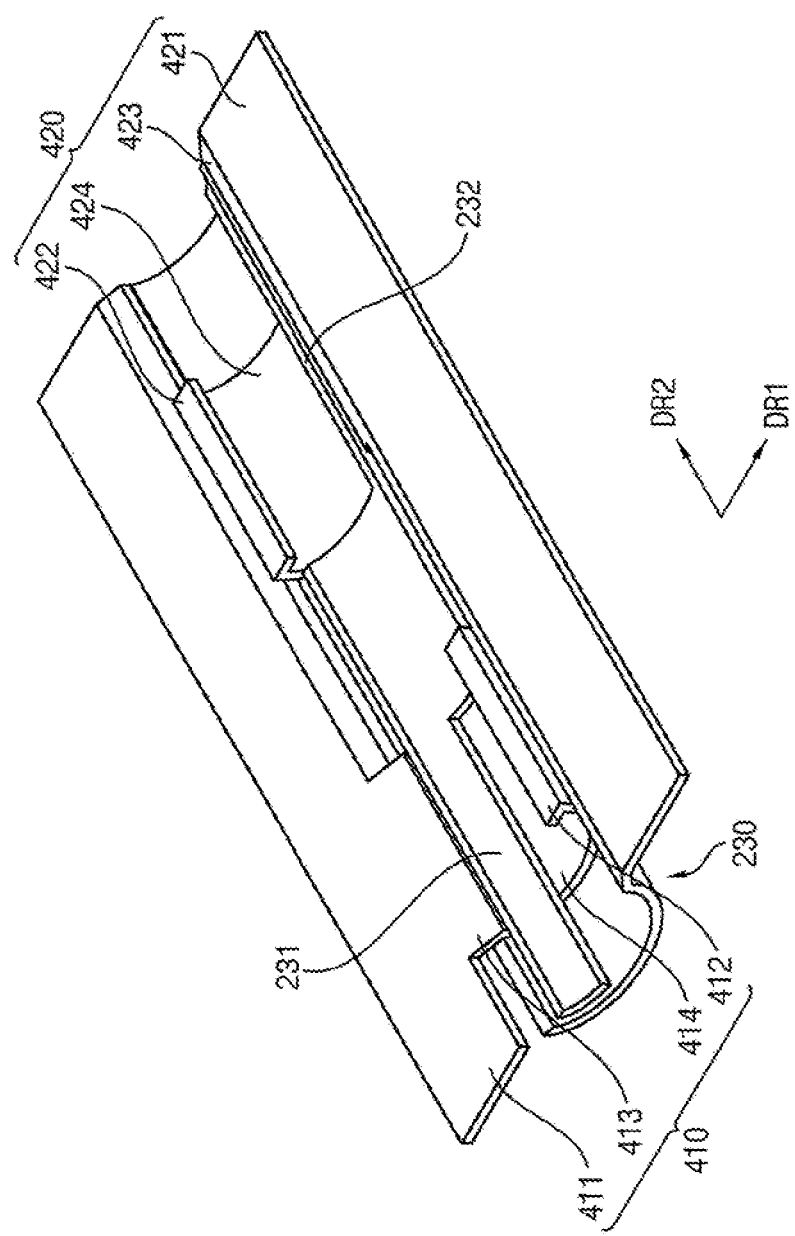
FIG. 5 is a perspective view of a coupling cover, a first hinge, and a second hinge of a foldable display device in FIG. 1.
Figure 6:
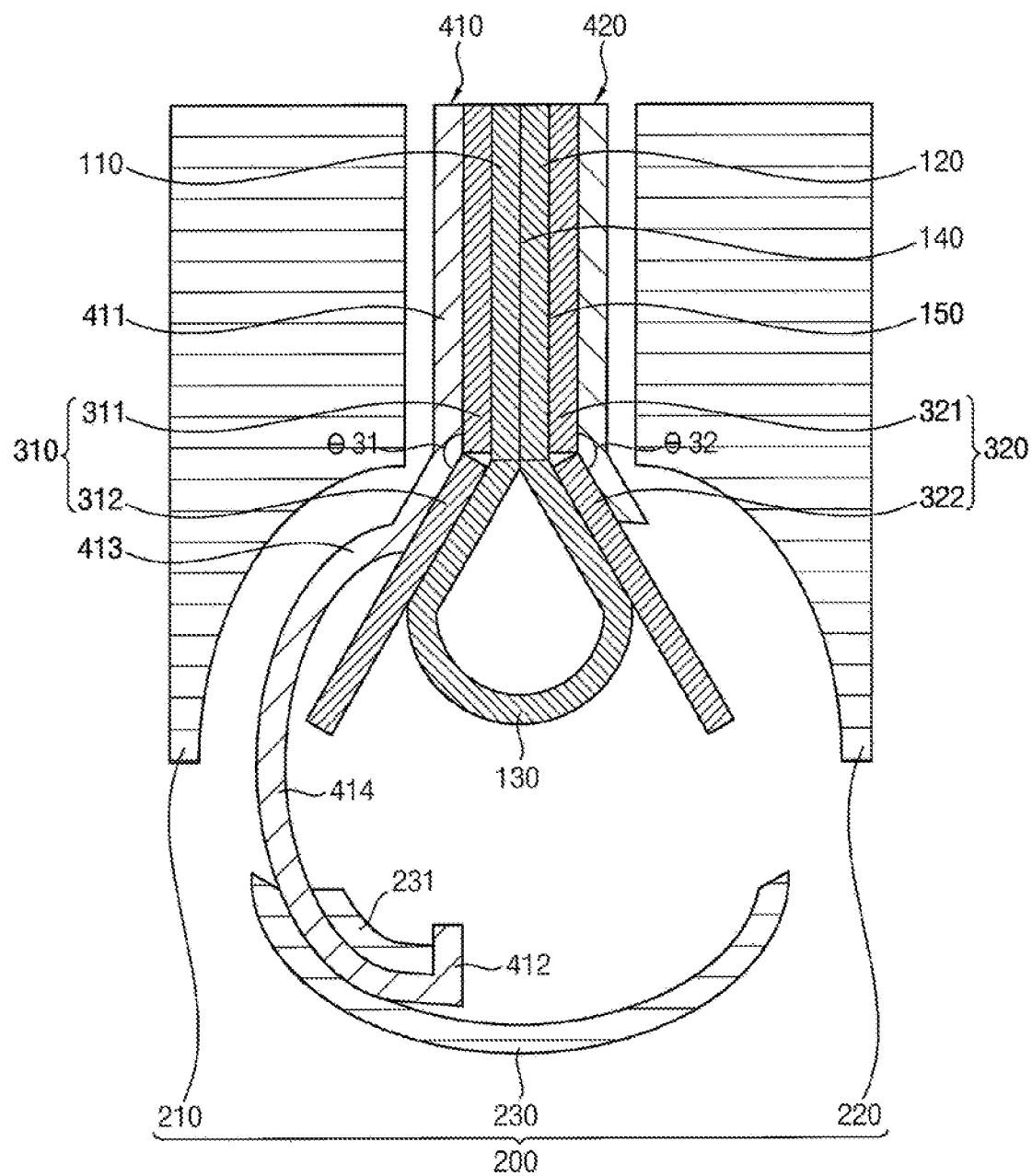
FIG. 6 is a cross-sectional view of a folded state of a foldable display device of FIG. 3.
Figure 7:
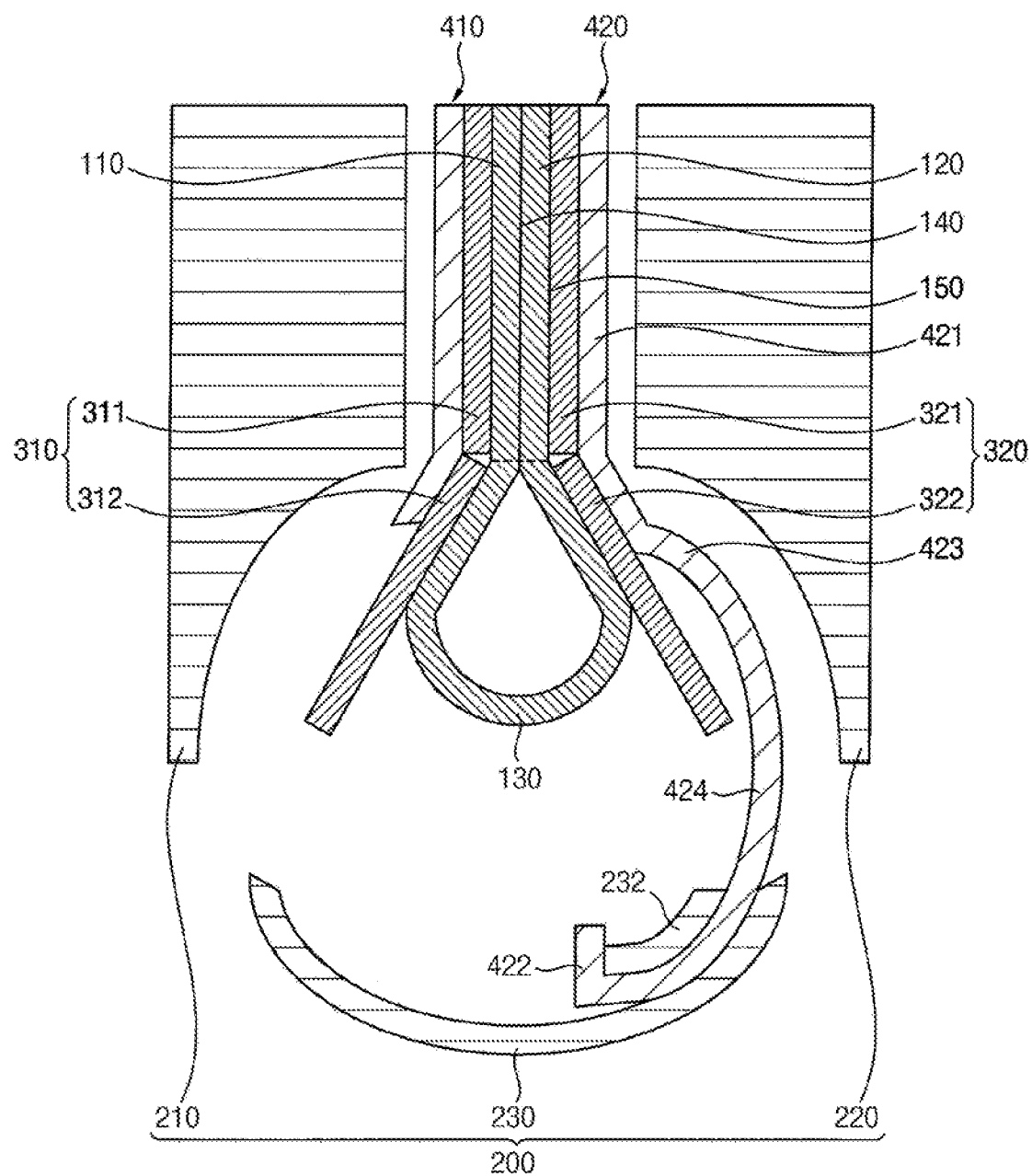
FIG. 7 is a cross-sectional view of a folded state of a foldable display device of FIG. 4.

FIG. 3 is a cross-sectional view of a foldable display device taken along a line A-A' of FIG. 1. FIG. 4 is a cross-sectional view of a foldable display device taken along a line B-B' of FIG. 1. FIG. 5 is a perspective view of a coupling cover, a first hinge, and a second hinge of a foldable display device in FIG. 1. FIG. 6 is a cross-sectional view of a folded state of a foldable display device of FIG. 3. FIG. 7 is a cross-sectional view of a folded state of a foldable display device of FIG. 4.

Referring to FIGS. 1, 3, 4, 5, 6, and 7, according to an embodiment, a foldable display device include a flexible display module 100, a case 200, a first metal plate 310, a second metal plate 320, a first hinge 410, and a second hinge 420.

According to an embodiment, the flexible display module 100 includes a first non-foldable portion 110, a second non-foldable portion 120, and a foldable portion 130. The foldable portion 130 is disposed between the first non-foldable portion 110 and the second non-foldable portion 120. The foldable portion 130 is positioned in the first direction DR1 from the first non-foldable portion 110, and the second non-foldable portion 120 is positioned in the first direction DR1 from the foldable portion 130. The first non-foldable portion 110 and the second non-foldable portion 120 are portions of the flexible display module 100 that are not folded. The foldable portion 130 is a portion of the flexible display module 100 that can be folded.

According to an embodiment, the flexible display module 100 includes a display surface 140 and a back surface 150 opposite to the display surface 140. The flexible display module 100 can display an image in a direction normal to the display surface 140. The back surface 150 is a non-display surface on which no image is displayed.

According to an embodiment, the case 200, which includes the first cover 210, the second cover 220, and the coupling cover 230, is disposed on the back surface 150 of the flexible display module 100. The first cover 210, the second cover 220, and the coupling cover 230 cover the first non-foldable portion 110, the second non-foldable portion 120, and the foldable portion 130, respectively. The coupling cover 230 includes a first coupling portion 231 and a second coupling portion 232 connected to the first hinge 410 and the second hinge 420, respectively.

According to an embodiment, the first metal plate 310 and the second metal plate 320 are disposed between the flexible display module 100 and the case 200. The first metal plate supports the first non-foldable portion 110 of the flexible display module 100 and the foldable portion 130 adjacent to the first non-foldable portion 110, and the second metal plate 320 supports the second non-foldable portion 120 of the flexible display module 100 and the foldable portion 130 adjacent to the second non-foldable portion 120.

According to an embodiment, the first metal plate 310 includes a first fixed portion 311 and a first rotatable portion 312. The first fixed portion 311 supports the first non-foldable portion 110, and the first rotatable portion 312 supports the foldable portion 130 adjacent to the first non-foldable portion 110. In an embodiment, an adhesive layer is substantially interposed between the first fixed portion 311 and the back surface 150 of the first non-foldable portion 110, and the first fixed portion 311 supports the first non-foldable portion 110 in a fixed state while substantially attached to the first non-foldable portion 110. Further, an adhesive layer is partially interposed between the first rotatable portion 312 and the back surface 150 of the foldable portion 130 adjacent to the first non-foldable portion 110, and the first rotatable portion 312 supports the foldable portion 130 adjacent to the first non-foldable portion 110 in a semi-fixed state while partially attached to the foldable portion 130 adjacent to the first non-foldable portion 110. For example, a portion of the first rotatable portion 312 adjacent to the first fixed portion 311 is attached to the foldable portion 130, and another portion of the first rotatable portion 312 spaced apart from the first fixed portion 311 is not attached to the foldable portion 130.

According to an embodiment, the second metal plate 320 includes a second fixed portion 321 and a second rotatable portion 322. The second fixed portion 321 supports the second non-foldable portion 120, and the second rotatable portion 322 supports the foldable portion 130 adjacent to the second non-foldable portion 120. In an embodiment, an adhesive layer is substantially interposed between the second fixed portion 321 and the back surface 150 of the second non-foldable portion 120, and the second fixed portion 321 supports the second non-foldable portion 120 in a fixed state while substantially attached to the second non-foldable portion 120. Further, an adhesive layer is partially interposed between the second rotatable portion 322 and the back surface 150 of the foldable portion 130 adjacent to the second non-foldable portion 120, and the second rotatable portion 322 supports the foldable portion 130 adjacent to the second non-foldable portion 120 in a semi-fixed state while partially attached to the foldable portion 130 adjacent to the second non-foldable portion 120. For example, a portion of the second rotatable portion 322 adjacent to the second fixed portion 321 is attached to the foldable portion 130, and another portion of the second rotatable portion 322 spaced apart from the second fixed portion 321 is not attached to the foldable portion 130.

According to an embodiment, each of the first metal plate 310 and the second metal plate 320 includes metal, plastic, etc. For example, the metal may include invar, nobinite, stainless steel, or an alloy thereof.

According to an embodiment, when a foldable display device is unfolded, the flexible display module 100 is unfolded such that portions of the display surface 440 are horizontally arranged on the same plane. For example, when an external force is applied outward to a folded foldable display, the first cover 210 and the second cover 220 respectively rotate in a counterclockwise direction and a clockwise direction about the coupling cover 230, so that the flexible display module 100 unfolds.

According to an embodiment, when a flexible display module 100 is unfolded, the display surface 140 of the first non-foldable portion 110, the display surface 140 of the second non-foldable portion 120, and the display surface 140 of the foldable portion 130 of the flexible display module 100 are coplanar with each other. Accordingly, the first rotatable portion 312 is coplanar with the first fixed portion 311, and the second rotatable portion 322 is coplanar with the second fixed portion 321.

According to an embodiment, when a foldable display device is folded, the flexible display module 100 is folded such that the portions of the display surface 140 face each other. For example, when an external force is applied inward to an unfolded foldable display device, the first cover 210 and the second cover 220 respectively rotate in a clockwise direction and a counterclockwise direction about the coupling cover 230, so that the flexible display module 100 folds.

According to an embodiment, when the flexible display module 10 is folded, the display surface 140 of the first non-foldable portion 110 and the display surface 140 of the second non-foldable portion 120 of the flexible display module 100 face each other. Further, the foldable portion 130 is bent to have a predetermined curvature. Specifically, referring to FIGS. 6 and 7, a first portion of the foldable portion 130 adjacent to the first non-foldable portion 110 extends in a diagonal direction from the first non-foldable portion 110 toward the first cover 210, a second portion of the foldable portion 130 adjacent to the second non-foldable portion 120 extends in a diagonal direction from the second non-foldable portion 120 toward the second cover 220, and a third portion of the foldable portion 130 spaced apart from the first non-foldable portion 110 and the second non-foldable portion 120, and located between the first portion of the foldable portion 130 adjacent to the first non-foldable portion 110 and the second portion of the foldable portion 130 adjacent to the second non-foldable portion 120, is bent in a semicircular shape. Accordingly, the first rotatable portion 312 forms an obtuse angle θ31 with the first fixed portion 311, and the second rotatable portion 322 forms an obtuse angle θ32 with the second fixed portion 321. Because the foldable portion 130 is bent with a predetermined curvature, the foldable portion 130 is not damaged when the flexible display module 100 is folded.

According to an embodiment, referring to FIGS. 3-5, the first hinge 410 is coupled to the first cover 210 and the first metal plate 310 and is disposed between the case 200 and the first metal plate 310. The first hinge 410 is rotatably connected to the coupling cover 230, and supports the first metal plate 310. The first hinge 410 includes a first fixed support portion 411 and a first portion. The first portion includes a first non-fixed support portion 412, a first straight portion 413, and a first curved portion 414.

According to an embodiment, the first fixed support portion 411 is combined with the first metal plate 310 and supports the first fixed portion 311.

According to an embodiment, the first non-fixed support portion 412 is spaced apart from the first fixed support portion 411, and is attached to the first fixed support portion 411 by the first straight portion 413, and the first curved portion 414. The first non-fixed support portion 412 supports the second rotatable portion 322 or is coupled to the coupling cover 230 by the first coupling portion 231 by a rotation of the first cover 210. The first non-fixed support portion 412 supports the second rotatable portion 322 when the flexible display module 100 is unfolded.

According to an embodiment, the first fixed support portion 411 and the first non-fixed support portion 412 aligned in substantially the same plane. For example, the first fixed support portion 411 and the first non-fixed support portion 412 are positioned at substantially a same distance from a lower surface of the first cover 210.

According to an embodiment, an area of the first fixed support portion 411 is greater than an area of the first non-fixed support portion 412. For example, a width 411W in the first direction DR1 of the first fixed support portion 411 is greater than a width 412W in the first direction DR1 of the first non-fixed support portion 412. Because the width in the first direction DR1 of the first fixed portion 311 is greater than the width in the first direction DR1 of the second rotatable portion 322, the width 411W in the first direction DR1 of the first fixed support portion 411 that supports the first fixed portion 311 is greater than the width 412W in the first direction DR1 of the first non-fixed support portion 412 that supports the second rotatable portion 322. Further, a width in the second direction DR2 perpendicular to the first direction DR1 of the first fixed support portion 411 is greater than a width in the second direction DR2 of the first non-fixed support portion 412.

According to an embodiment, the first straight portion 413 is adjacent and attached to the first fixed support portion 411. The first straight portion 413 is coupled to a first end 230a of the coupling cover 230 or supports the first rotatable portion 312 when the first cover 210 is rotated. The first straight portion 413 supports the first rotatable portion 312 when the flexible display module 100 is folded.

According to an embodiment, the first straight portion 413 forms an obtuse angle θ11 with the first fixed support portion 411. For example, the first straight portion 413 extends in a diagonal direction toward the first cover 210 from an end of the first fixed support portion 411.

According to an embodiment, referring to FIG. 5, a width in the second direction DR2 of the first straight portion 413 is less than a width in the second direction DR2 of the first fixed support portion 411, but is substantially the same as the width in the second direction DR2 of the first non-fixed support portion 412 and the width in the second direction DR2 of the first curved portion 414. Because the width in the second direction DR2 of the first fixed support portion 411 is greater than the width in the second direction DR2 of the first non-fixed support portion 412, the width in the second direction DR2 of the first fixed support portion 411 is greater than the width in the second direction DR2 of the first straight portion 413 and the width in the second direction DR2 of the first curved portion 414.

According to an embodiment, the first curved portion 414 is disposed between and attached to the first non-fixed support portion 412 and the first straight portion 413. The first curved portion 414 is slidably and rotatably connected to the coupling cover 230. The first curved portion 414 is slidably and rotatably connected to the first coupling portion 231. The first curved portion 414 is substantially concentric with the coupling cover 230. Accordingly, a curvature of the first curved portion 414 is greater than a curvature of the coupling cover 230.

According to an embodiment, referring to FIG. 3, the first straight portion 413 forms an obtuse angle θ12 with the first curved portion 414. Because the first straight portion 413 and the first curved portion 414 are not collinear with each other at a point between the first straight portion 413 and the first curved portion 414, the first end 230a of the coupling cover 230 is positioned between the first straight portion 413 and the first curved portion 414, which limits a rotation range of the first hinge 410 in a counterclockwise direction when the flexible display module 100 is unfolded.

According to an embodiment, referring to FIG. 6, the first non-fixed support portion 412 forms an acute angle θ13 with the first curved portion 414. Because the first non-fixed support portion 412 and the first curved portion 414 are not collinear with each other at a point between the first non-fixed support portion 412 and the first curved portion 414, the first coupling portion 231 of the coupling cover 230 is positioned between the first non-fixed support portion 412 and the first curved portion 414, which limits a rotation range of the first hinge 410 in a clockwise direction when the flexible display module 100 folded.

According to an embodiment, referring to FIG. 5, a width in the second direction DR2 of the first curved portion 414 is substantially the same as the width in the second direction DR2 of the first non-fixed support portion 412. Because the width in the second direction DR2 of the first non-fixed support portion 412 is less than the width in the second direction DR2 of the first fixed support portion 411, the width in the second direction DR2 of the first curved portion 414 is less than the width in the second direction DR2 of the first fixed support portion 411.

According to an embodiment, referring to FIG. 3, the first hinge 410 has a uniform thickness 410T. A thickness of the first fixed support portion 411, a thickness of the first non-fixed support portion 412, a thickness of the first straight portion 413, and a thickness of the first curved portion 414 are substantially the same.

According to an embodiment, referring to FIGS. 3-5, the second hinge 420 is coupled to the second cover 220 and the second metal plate 320 and is disposed between the case 200 and the second metal plate 320. The second hinge 420 is rotatable connected to the coupling cover 230, and supports the second metal plate 320. The second hinge 420 includes a second fixed support portion 421 and a second portion. The second portion includes a second non-fixed support portion 422, a second straight portion 423, and a second curved portion 424.

According to an embodiment, the second fixed support portion 421 is combined with the second metal plate 320 and supports the second fixed portion 321.

According to an embodiment, the second non-fixed support portion 422 is spaced apart from the second fixed support portion 421, and is attached to the second fixed support portion 421 by the second straight portion 423, and the second curved portion 424. The second non-fixed support portion 422 supports the first rotatable portion 312 or is coupled to the coupling cover 230 by the second coupling portion 232 by a rotation of the second cover 220. The second non-fixed support portion 422 supports the first rotatable portion 312 when the flexible display module 100 is unfolded.

According to an embodiment, the second fixed support portion 421 and the second non-fixed support portion 422 are aligned in substantially the same plane. For example, the second fixed support portion 421 and the second non-fixed support portion 422 are positioned at substantially a same distance from a lower surface of the second cover 220.

According to an embodiment, an area of the second fixed support portion 421 is greater than an area of the second non-fixed support portion 422. For example, a width 421W in the first direction DR1 of the second fixed support portion 421 is greater than a width 422W in the first direction DR1 of the second non-fixed support portion 422. Because the width in the first direction DR1 of the second fixed portion 321 is greater than the width in the first direction DR1 of the first rotatable portion 312, the width 421W in the first direction DR1 of the second fixed support portion 421 that supports the second fixed portion 321 is greater than the width 422W in the first direction DR1 of the second non-fixed support portion 422 that supports the first rotatable portion 312. Further, a width in the second direction DR2 of the second fixed support portion 421 is greater than a width in the second direction DR2 of the second non-fixed support portion 422.

According to an embodiment, the second straight portion 423 is adjacent and attached to the second fixed support portion 421. The second straight portion 423 is coupled to a second end 230b of the coupling cover 230 or supports the second rotatable portion 322 when the second cover 220 is rotated. The second straight portion 423 supports the second rotatable portion 322 when the flexible display module 100 is folded.

According to an embodiment, the second straight portion 423 forms an obtuse angle θ21 with the second fixed support portion 421. For example, the second straight portion 423 extends in a diagonal direction toward the second cover 220 from an end of the second fixed support portion 421.

According to an embodiment, referring to FIG. 5, a width in the second direction DR2 of the second straight portion 423 is less than a width in the second direction DR2 of the second fixed support portion 421, but is substantially the same as the width in the second direction DR2 of the second non-fixed support portion 422 and the width in the second direction DR2 of the second curved portion 424. Because the width in the second direction DR2 of the second fixed support portion 421 is greater than the width in the second direction DR2 of the second non-fixed support portion 422, the width in the second direction DR2 of the second fixed support portion 421 is greater than the width in the second direction DR2 of the second straight portion 423 and the width in the second direction DR2 of the second curved portion 424.

According to an embodiment, the second curved portion 424 is disposed between the second non-fixed support portion 422 and the second straight portion 423. The second curved portion 424 is slidably and rotatably connected to the coupling cover 230. The second curved portion 424 is slidably and rotatably connected to the second coupling portion 232. The second curved portion 424 is substantially concentric with the coupling cover 230. Accordingly, a curvature of the second curved portion 424 is greater than a curvature of the coupling cover 230.

According to an embodiment, referring to FIG. 4, the second straight portion 423 forms an obtuse angle θ22 with the second curved portion 424. Because the second straight portion 423 and the second curved portion 424 are not collinear with each other at a point between the second straight portion 423 and the second curved portion 424, the second end 230*b* of the coupling cover 230 is positioned between the second straight portion 423 and the second curved portion 424, which limits a rotation range of the second hinge 420 in a clockwise direction when the flexible display module 100 is unfolded.

According to an embodiment, the second non-fixed support portion 422 forms an acute angle θ23 with the second curved portion 424. Because the second non-fixed support portion 422 and the second curved portion 424 are not with each other at a point between the second non-fixed support portion 422 and the second curved portion 424, the second coupling portion 232 of the coupling cover 230 is positioned between the second non-fixed support portion 422 and the second curved portion 424, which limits a rotation range of the second hinge 420 in a counter-clockwise direction when the flexible display module 100 is folded.

According to an embodiment, referring to FIG. 5, a width in the second direction DR2 of the second curved portion 424 is substantially the same as the width in the second direction DR2 of the second non-fixed support portion 422. Because the width in the second direction DR2 of the second non-fixed support portion 422 is less than the width in the second direction DR2 of the second fixed support portion 421, the width in the second direction DR2 of the second curved portion 424 is less than the width in the second direction DR2 of the second fixed support portion 421.

According to an embodiment, referring to FIG. 4, the second hinge 420 has a uniform thickness 420T. A thickness of the second fixed support portion 421, a thickness of the second non-fixed support portion 422, a thickness of the second straight portion 423, and a thickness of the second curved portion 424 are substantially the same.

According to an embodiment, each of the first hinge 410 and the second hinge 420 includes a metal. For example, the metal may include invar, nobinite, stainless steel, or an alloy thereof.

Figure 8:
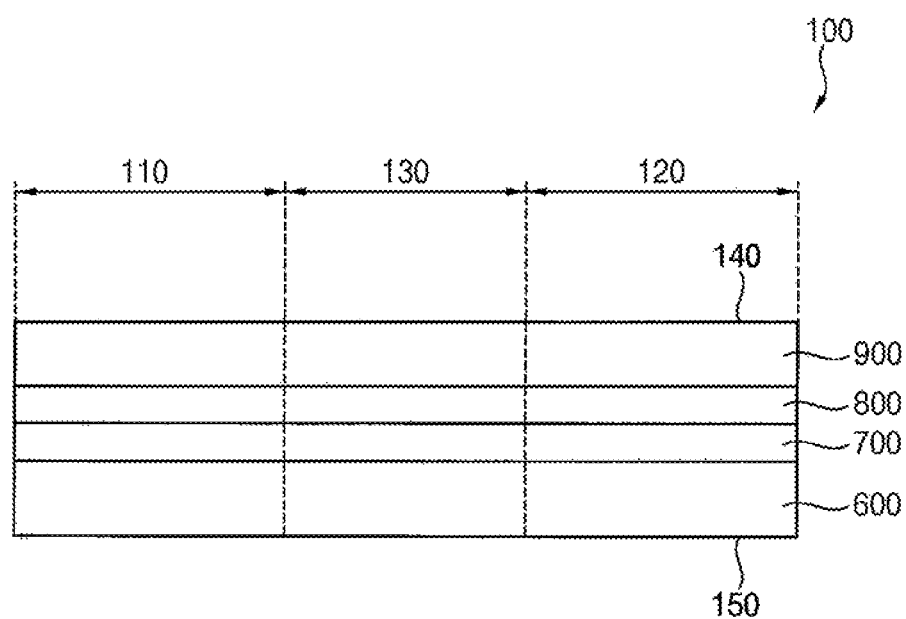
FIG. 8 is a cross-sectional view of a flexible display module according to an embodiment of the present disclosure.

FIG. 8 is a cross-sectional view of the flexible display module 100 according to an embodiment of the present disclosure.

Referring to FIG. 8, according to an embodiment, the flexible display module 100 may include a display panel 600, a sensing layer 700, a polarization layer 800, and a window 900. As described above, since the flexible display module 100 can be folded or unfolded, each of the display panel 600, the sensing layer 700, the polarization layer 800, and the window 900 is flexible.

According to an embodiment, the display panel 600 includes a plurality of pixels, and generates an image formed by emitting light from the pixels. The display panel 600 includes a first surface and a second surface that are opposite to each other. The display panel 600 displays an image from the first surface, and the second surface of the display panel 600 corresponds to the back surface 150 of the flexible display module 100.

According to an embodiment, the sensing layer 700 is disposed on the display panel 600. The sensing layer 700 can sense an external input, such as an external object that comes into contact with or approaches the foldable display device. For example, the sensing layer 700 can sense an external input by using a capacitive scheme.

According to an embodiment, the polarization layer 800 is disposed on the sensing layer 700. The polarization layer 800 reduces reflection of external light from the foldable display device. For example, when external light passes through the polarization layer 800, is reflected from a lower portion of the polarization layer 800, such as the display panel 600, and passes through the polarization layer 800 again, the external light passes through the polarization layer 800 twice, and thus a phase of the external light changes. Accordingly, the phase of the reflected light differs from the phase of the incident light entering the polarization layer 800, so that destructive interference can occur, which decreases the reflection of the external light, so that the visibility of the foldable display device is improved.

According to an embodiment, the window 900 is disposed on the polarization layer 800. The window 900 protects the display panel 600, the sensing layer 700, and the polarization layer 800 from external shocks, and provides the display surface 140 of the flexible display module 100. In one embodiment, the window 900 includes a polymer resin such as polycarbonate (PC), polymethyl methacrylate (PMMA), polyarylate (PAR), polyethersulfone (PES), polyethylene terephthalate (PET), or polyethylene naphthalate (PEN), glass, etc.

Figure 9:
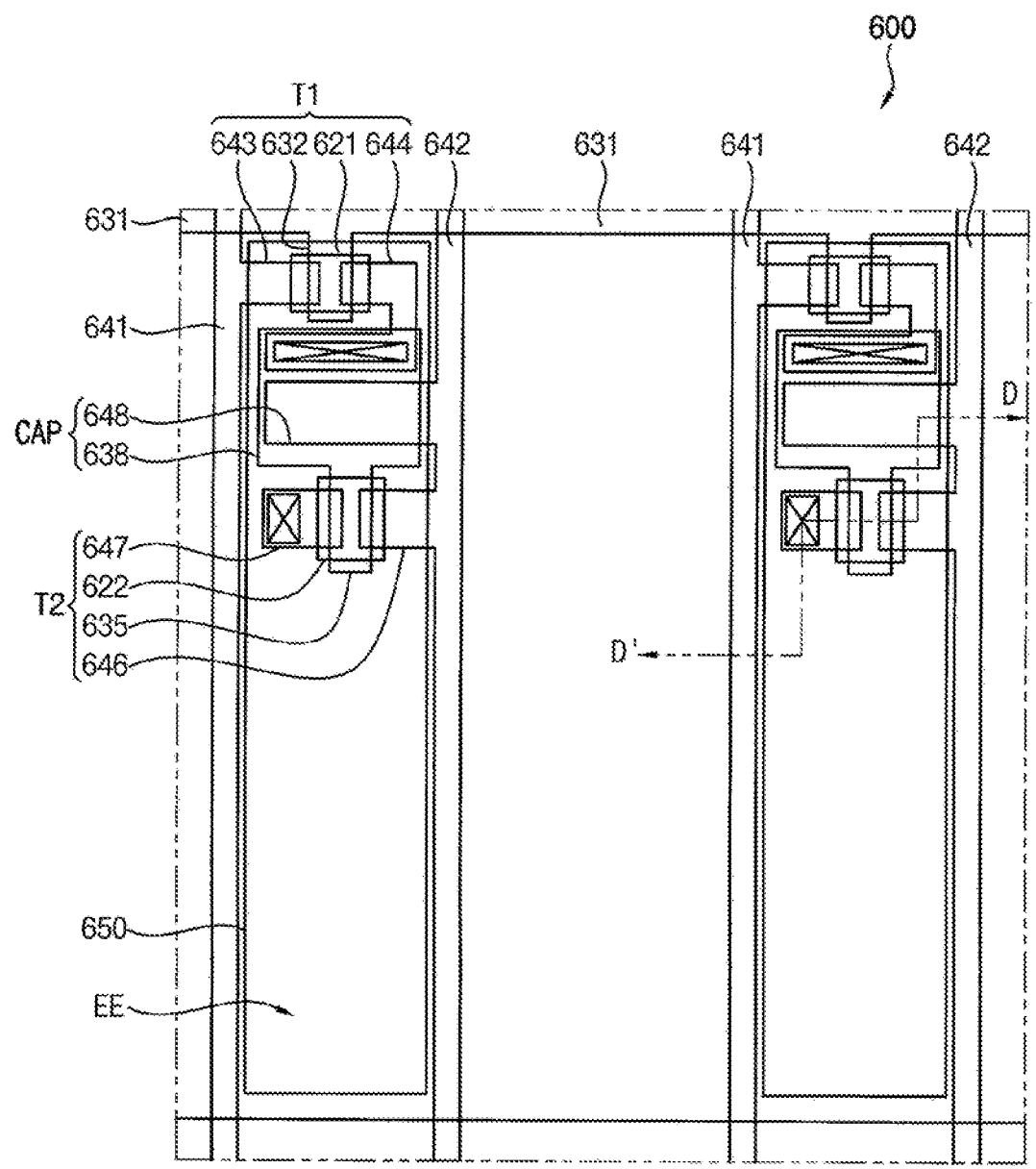
FIG. 9 is a plan view of a display panel according to an embodiment of the present disclosure.
Figure 10:
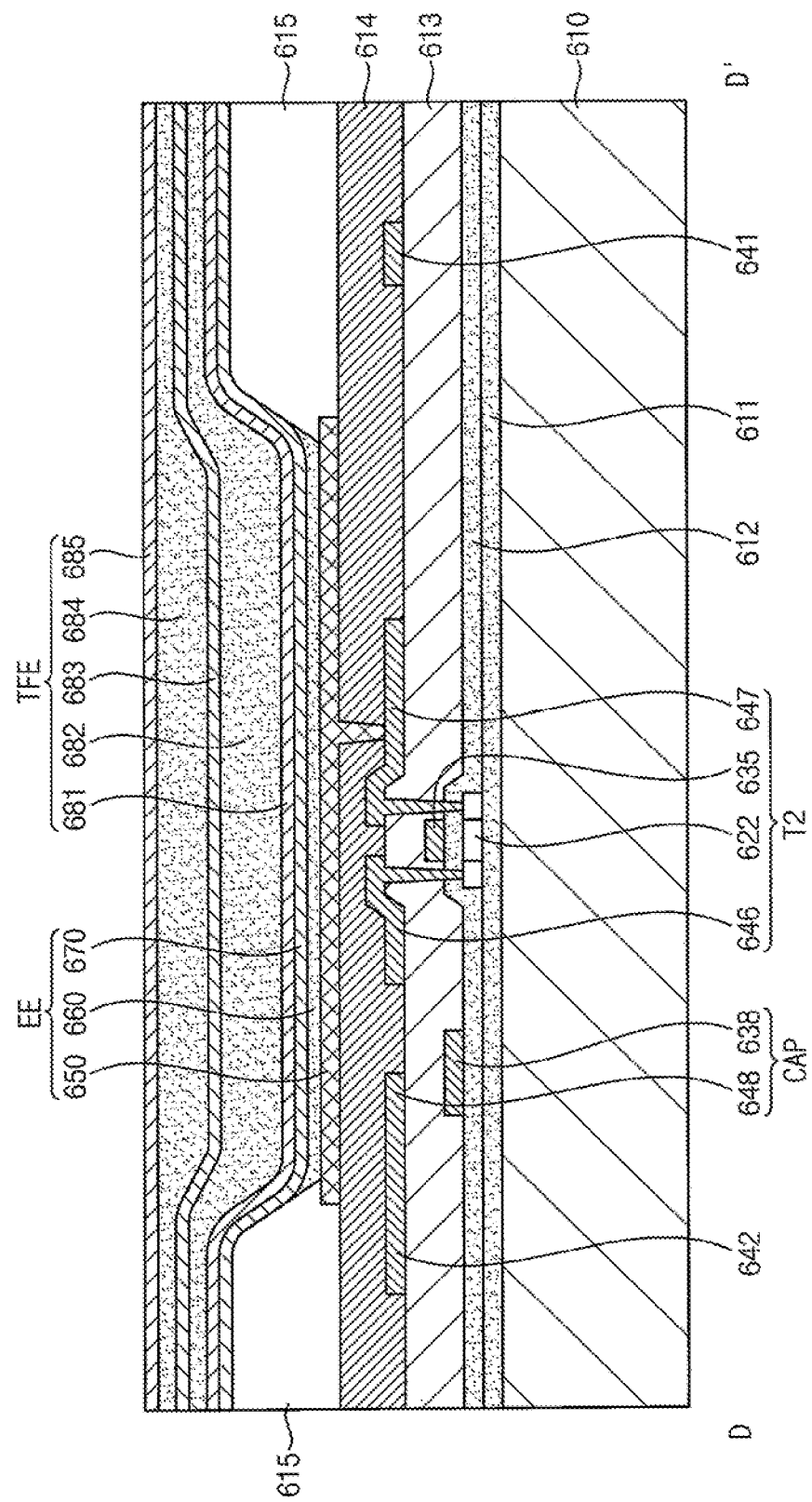
FIG. 10 is a cross-sectional view taken along a line D-D' of FIG. 9.

FIG. 9 is a plan view of the display panel 600 according to an embodiment of the present disclosure. FIG. 10 is a cross-sectional view taken along a line D-D' of FIG. 9.

Referring to FIGS. 9 and 10, according to an embodiment, the display panel 600 includes a plurality of pixels in which each of the pixels includes a switching thin film transistor T1, a driving thin film transistor T2, a capacitor CAP, and a light emitting device EE. The pixel is a minimum unit for displaying an image, and the display panel 600 displays an image through the pixels.

Although FIGS. 9 and 10 show that two thin film transistors and one capacitor are disposed in one pixel, embodiments of the present disclosure are not limited thereto, and in other embodiments, one pixel can be provided with at least three thin film transistors or at least two capacitors.

According to an embodiment, the display panel 600 includes a substrate 610, a gate line 631 disposed on the substrate 610, a data line 641 disposed on the substrate and that is insulated from and intersects the gate line 631, and a common power line 642 disposed on the substrate. In general, one pixel is defined by a boundary between the gate line 631, the data line 641, and the common power line 642, but a pixel is not limited to the above-described definition. In other embodiments, a pixel can be defined by a black matrix or a pixel defining layer.

According to an embodiment, the substrate 610 includes a flexible material such as plastic. For example, the substrate 610 may be formed of polyethersulfone (PES), polycarbonate (PC), polyimide (PI), polyethylene terephthalate (PET), polyethylene naphthalate (PEN), polyacrylate (PAR), or fiber reinforced plastic (FRP), etc.

According to an embodiment, the substrate 610 has a thickness from about 5 μm to about 200 μm. When the substrate 610 has a thickness less than about 5 μm, the substrate 610 may not stably support the light emitting, device EE. In addition, when the substrate 610 has a thickness greater than about 200 μm, the substrate 610 may lose flexibility.

According to an embodiment, a buffer layer 611 is disposed on the substrate 610. The butler layer 611 prevents the penetration of impurities and planarizes a surface. The buffer layer 611 may be formed of silicon nitride, silicon oxide, or silicon oxynitride, etc. However, the butler layer 611 is not necessarily required, and is omitted in other embodiments, according to a type of the substrate 610 and the processing conditions.

According to an embodiment, a switching semiconductor layer 621 and a driving semiconductor layer 622 are disposed on the buffer layer 611. The switching semiconductor layer 621 and the driving semiconductor layer 622 are formed of one of a silicon semiconductor such as polycrystalline silicon or amorphous silicon, or an oxide semiconductor such as indium gallium zinc oxide (IGZO) or indium zinc tin oxide (IZTO). For example, when the driving semiconductor layer 622 is formed of polycrystalline silicon, the driving semiconductor layer 622 includes a channel region that is not doped with impurities, and a source region and a drain region that are formed by doping impurities on both sides of the channel region. In this case, the doped impurities are P-type impurities such as boron (B), and $B_2H_6$ is mainly used. The impurities vary depending on the type of thin film transistor. Although a thin film transistor having a PMOS structure using P-type impurities is used as the driving thin film transistor T2 in this embodiment, embodiments are not limited thereto, and a thin film transistor having an NMOS structure or a CMOS structure may be used as the driving thin film transistor T2.

According to an embodiment, a gate insulating layer 612 is disposed on the buffer layer 611 and covers the switching semiconductor layer 621 and the driving semiconductor layer 622. The gate insulating layer 612 may be formed of tetraethoxysilane (TEOS), silicon nitride, or silicon oxide, or the like. In an embodiment, the gate insulating film 612 has a double-film structure in which a silicon nitride film having a thickness of about 40 nm and a tetraethoxysilane film having a thickness of about 80 nm are sequentially laminated.

According to an embodiment, a gate wiring that includes gate electrodes 632 and 635 is disposed on the gate insulating layer 612. The gate wiring further includes a gate line 631, a first power storage plate 638, etc. The gate electrodes 632 and 635 overlap at least a part, such as the channel region, of the semiconductor layers 621 and 622, respectively. When impurities are doped in the source region and the drain region of the semiconductor layers 621 and 622 when forming the semiconductor layers 621 and 622, the gate electrodes 632 and 635 block the impurities from being doped in the channel region.

According to an embodiment, the gate electrodes 632 and 635 and the first power storage plate 638 are disposed on the same layer, and are formed of substantially the same metal. For example, the gate electrodes 632 and 635 and the first power storage plate 638 may be formed of molybdenum (Mo), chromium (Cr), or tungsten (W), etc.

According to an embodiment, an interlayer insulating layer 613 that covers the gate electrodes 632 and 635 is disposed on the gate insulating layer 612. Like the gate insulating layer 612, the interlayer insulating layer 613 may be formed of tetraethoxysilane, silicon nitride, or silicon oxide, but in other embodiments, the material of the interlayer insulating layer 613 is not limited thereto.

According to an embodiment, data wirings that include source electrodes 643 and 646 and drain electrodes 644 and 647 are disposed on the interlayer insulating layer 613. The data wirings further include a data line 641, a common power line 642, a second power storage plate 648, etc. The source electrodes 643 and 646 and the drain electrodes 644 and 647 are connected to the respective source region and the drain region of the semiconductor layers 621 and 622 through contact holes formed in the gate insulating layer 612 and the interlayer insulating layer 613.

According to an embodiment, the switching thin film transistor T1 includes a switching semiconductor layer 621, a switching gate electrode 632, a switching source electrode 643, and a switching drain electrode 644, and the driving thin film transistor T2 includes a driving semiconductor layer 622, a driving gate electrode 635, a driving source electrode 646, and a driving drain electrode 647. In addition, the capacitor CAP includes the first power storage plate 638 and the second power storage plate 648 that are disposed with the interlayer insulating layer 613 therebetween.

According to an embodiment, the switching thin film transistor T1 is a switching device that selects a pixel to emit light. The switching gate electrode 632 is connected to the gate line 631. The switching source electrode 643 is connected to the data line 641. The switching drain electrode 644 is spaced apart from the switching source electrode 643 and connected to the first power storage plate 638.

According to an embodiment, the driving thin film transistor T2 applies a driving power to a pixel electrode 650, which allows a tight emitting layer 660 of the light emitting device EE in the selected pixel to emit light. The driving gate electrode 635 is connected to the first power storage plate 638. The driving source electrode 646 and the second power storage plate 648 are connected to the common power line 642. The driving drain electrode 647 is connected to the pixel electrode 650 of the light emitting device EE through a contact hole.

According to an embodiment, in the above structure, the switching thin film transistor T1 is operated by a gate voltage applied to the gate line 631, which serves to transmit the data voltage applied to the data line 641 to the driving thin film transistor T2. A voltage that corresponds to a difference between the common voltage applied to the driving thin film transistor T2 from the common power line 642 and the data voltage received from the switching thin film transistor T1 is stored in the capacitor CAP, and a current corresponding to the voltage stored in the capacitor CAP flows into the light emitting device EE through the driving thin film transistor T2, so that the light emitting device EE can emit light.

According to an embodiment, a planarization layer 614 is disposed on the interlayer insulating layer 613 and covers the data line 641, the common power line 642, the source electrodes 643 and 646, the drain electrodes 644 and 647, and the second power storage plate 648.

According to an embodiment, the planarization layer 614 removes and planarizes steps to increase a luminance efficiency of the light emitting device EE formed thereon. The planarization layer 614 may be formed of an acrylic-based resin, such as polyacrylates resin, an epoxy resin, a phenolic resins, a polyamide-based resin, a polyimide-based resin, an unsaturated polyester-based resin, a polyphenylene-based resin, a polyphenylene sulfide-based resin, or a benzocyclobutene (BCB), etc.

According to an embodiment, the light emitting device EE includes the pixel electrode 650, the light emitting layer 660, and a common electrode 670. The pixel electrode 650 is disposed on the planarization layer 614. The pixel electrode 650 is connected to the drain electrode 647 through a contact hole formed in the planarization layer 614.

According to an embodiment, a pixel defining layer 615 is disposed on the planarization layer 614 and exposes at least a part of the pixel electrode 650 so as to define a pixel region. The pixel electrode 650 corresponds to the pixel region of the pixel defining layer 615. The pixel defining layer 615 may be formed of a polyacrylate-based resin or a polyimide-based resin, etc.

According to an embodiment, the light emitting layer 660 is disposed on the pixel electrode 650 in the pixel region, and the common electrode 670 is disposed on the pixel defining layer 615 and the light emitting layer 660. The light emitting layer 660 is formed of a low molecular organic material or a high molecular organic material. At least one of a hole injection layer (HIL) or a hole transport layer (HTL) is further disposed between the pixel electrode 650 and the light emitting layer 660, and at least one of an electron transport layer (ETL) or an electron injection layer (EIL) is further disposed between the light emitting layer 660 and the common electrode 670.

According to an embodiment, each of the pixel electrode 650 and the common electrode 670 are formed from any one of a transmissive electrode, a transflective electrode, or a reflective electrode.

According to an embodiment, a transparent conductive oxide (TCO) is used to form the transmissive electrode. A transparent conductive oxide (TCO) includes indium tin oxide (ITO) indium zinc oxide (IZO), zinc oxide (ZnO), indium oxide (In2O3), etc.

According to an embodiment, to form the transflective electrode or the reflective electrode, a metal such as magnesium (Mg), silver (Ag), gold (Au), calcium (Ca), lithium (Li), chromium (Cr), aluminum (Al), copper (Cu), or an alloy thereof is used. At this time, a determination between a transflective electrode or a reflective electrode depends on a thickness. In general, a transflective electrode has a thickness of about 200 nm or less, and a reflective electrode has a thickness of about 300 nm or more. A transflective electrode has a higher light transmittance but also a higher resistance as the thickness decreases, and has a lower light transmittance as the thickness increases. In addition, a transflective electrode and a reflective electrode are formed in a multilayer structure that includes a metal layer formed of a metal or a metal alloy and a transparent conductive oxide layer laminated on the metal layer.

According to an embodiment, a thin film encapsulation layer TFE is be disposed on the common electrode 670. The thin film encapsulation layer TFE includes at least one inorganic film 681, 683, or 685, and at least one organic film 682 or 684. In addition, the thin film encapsulation layer TFE has a structure in which the inorganic films 681, 683 and 685 and organic films 682 and 684 are alternately laminated. In this case, the inorganic film 681 is disposed at the bottom. In other words, an inorganic film is disposed most adjacent to the light emitting device EE.

According to an embodiment, although FIG. 10 shows that the thin film encapsulation layer TFE includes three inorganic films 681, 683 and 685 and two organic films 682 and 684, embodiments of the present disclosure are not limited thereto.

According to an embodiment, the inorganic films 681, 683 and 685 are formed of at least one inorganic material of $Al_2O_3$, $TiO_2$, $ZrO$, $SiO_2$, AlON, AlN, SiON, $Si_3N_4$, ZnO, or $Ta_2O_5$. The inorganic films 681, 683 and 685 may be formed through chemical vapor deposition (CVD) or atomic layer deposition (ALD). The inorganic films 681, 683 and 685 mainly block the penetration of moisture or oxygen. The inorganic films 681, 683 and 685 block most moisture and oxygen from penetrating into the light emitting device (EE).

According to an embodiment, the organic films 682 and 684 are formed of a polymer-based material. The polymer-based material includes acrylate-based resin, epoxy-based resin, polyimide, or polyethylene, etc. In addition, the organic films 682 and 684 are formed through a thermal deposition process. A thermal deposition process that forms the organic films 682 and 684 is performed in a temperature range that does not damage the light emitting device EE.

According to an embodiment, the thin film encapsulation layer TFE has a thickness of about 10 μm or less. Accordingly, the overall thickness of the display panel 600 is very thin. As such, the thin film encapsulation layer TFE is disposed on the light emitting device EE, to maximize the flexible characteristics of the display panel 600.

Figure 11:
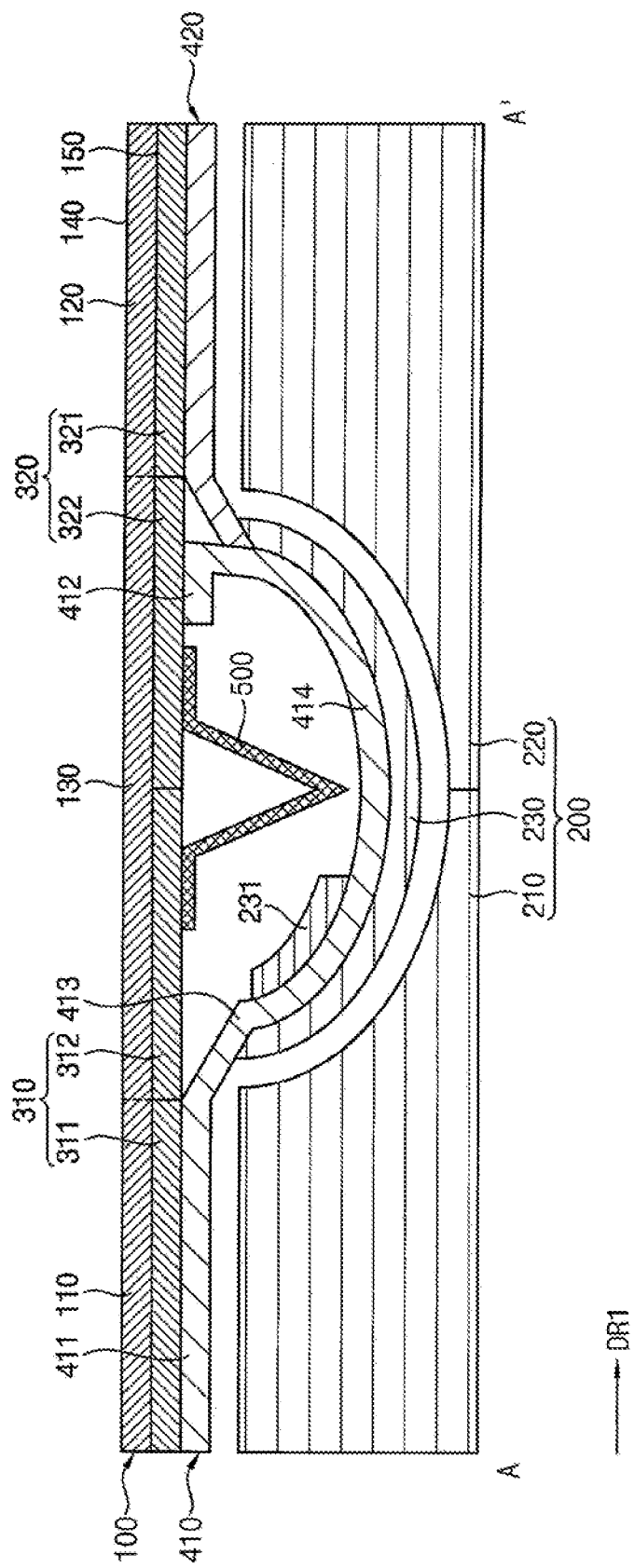
FIG. 11 is a cross-sectional view of another foldable display device taken along a line A-A' of FIG. 1.
Figure 12:
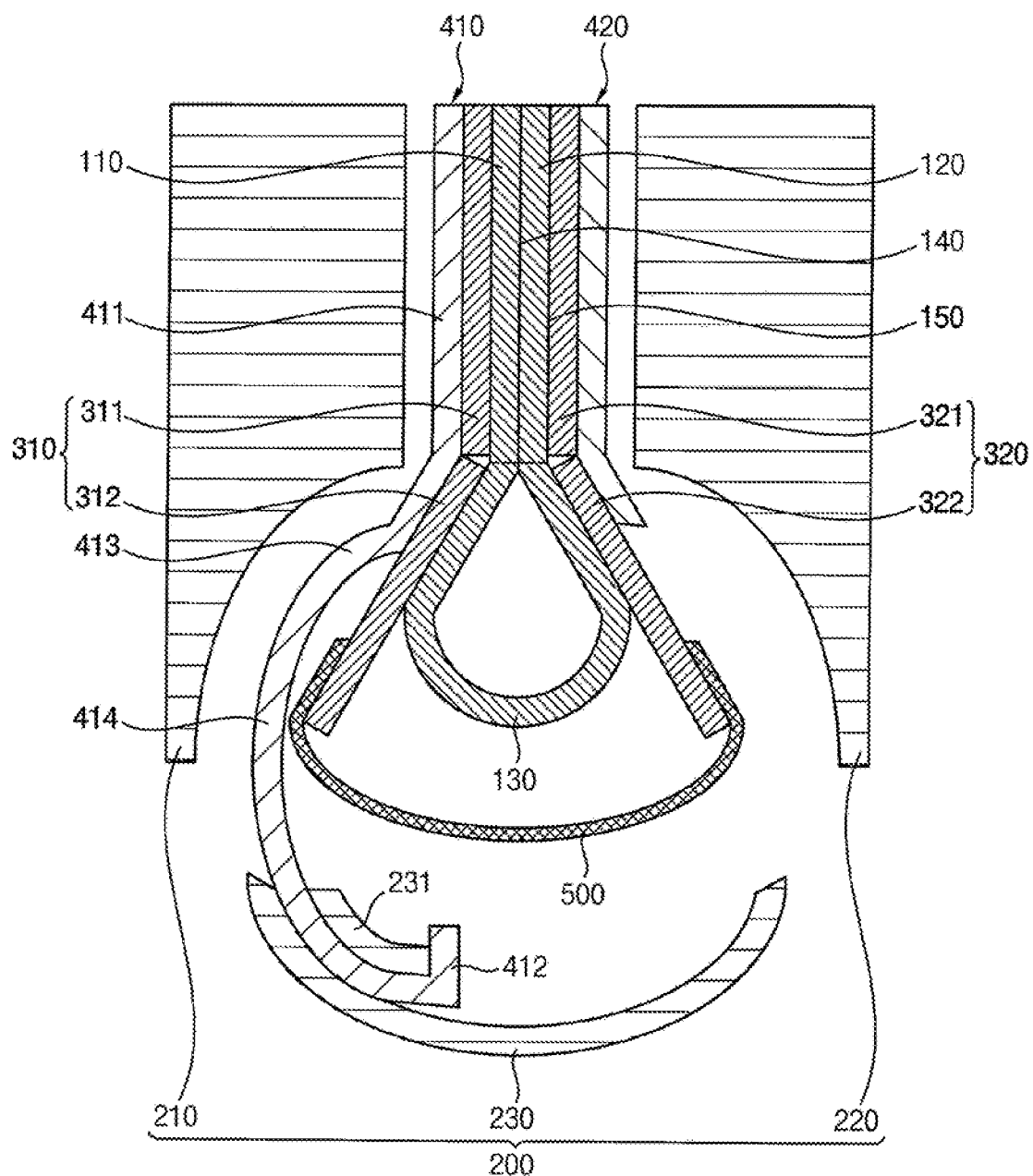
FIG. 12 is a cross-sectional view of a folded state of a foldable display device of FIG. 11.

FIG. 11 is a cross-sectional view that illustrates another foldable display device taken along line A-A' of FIG. 1. FIG. 12 is a cross-sectional view of a folded state of a foldable display device of FIG. 11.

Referring to FIGS. 1, 11, and 12, according to an embodiment, a foldable display device further includes a protective layer 500. The protective layer 500 is coupled between the first metal plate 310 and the second metal plate 320 and covers the back surface 150 of the foldable portion 130 of the flexible display module 100 that is exposed between the first metal plate 310 and the second metal plate 320. For example, the protective layer 500 is attached to a lower surface of the first rotatable portion 312 and a lower surface of the second rotatable portion 322, and extends downward from the lower surfaces of the first rotatable portion 312 and the second rotatable portion 322. Although FIG. 10 shows the protective layer 500 as forming a V-shape, embodiments are not limited thereto, and the shape of the protective layer 500 is not predetermined in other embodiments.

According to an embodiment, the protective layer 500 is positioned inside the coupling cover 230. Because each of the first curved portion 414 of the first hinge 410 and the second curved portion 424 of the second hinge 420 is slidably and rotatably connected to the coupling cover 230 and is substantially concentric with the coupling cover 230, a space in which additional structures such as the protective layer 500, etc., can be disposed is provided inside the coupling cover 230.

According to an embodiment, the protective layer 500 is flexible. In one embodiment, the protective layer 500 is a flexible thin film tape. Because the protective layer 500 is flexible, the shape of the protective layer 500 can deform according to the rotations of the first metal plate 310 and the second metal plate 320 to which the protective layer 500 is coupled.

According to an embodiment, the protective layer 500 is folded when the flexible display module 100 is unfolded, and the protective layer 500 is unfolded when the flexible display module 100 is folded. Since the interval between the first metal plate 310 and the second metal plate 320 is reduced when the flexible display module 100 is unfolded, the flexible protective layer 500 coupled to the first metal plate 310 and the second metal plate 320 folds into unpredetermined shape. Since the interval between the first metal plate 310 and the second metal plate 320 increases when the flexible display module 100 is folded, the flexible protective layer 500 coupled to the first metal plate 310 and the second metal plate 320 unfolds along the shape of the foldable portion 130 of the flexible display module 100.

A foldable display device according to embodiments can be incorporated into a display device included in a computer, a notebook, a mobile phone, a smartphone, a smart pad, a PMP, a PDA, or an MP3 player, etc.

Although a foldable display device according to exemplary embodiments has been described with reference to the drawings, exemplary embodiments are not limiting, and may be modified and changed by a person having ordinary knowledge in the relevant technical field without departing from the technical spirit described in the following claims.

What is claimed is:

1. A foldable display device, comprising:
a flexible display module that includes a first non-foldable portion, a second non-foldable portion, and a foldable portion disposed between the first non-foldable portion and the second non-foldable portion;
a case disposed on the flexible display module and that includes a first cover that covers the first non-foldable portion, a second cover that covers the second non-foldable portion, and a coupling cover that covers the foldable portion;
a first metal plate disposed between the flexible display module and the case and that includes a first fixed portion that supports the first non-foldable portion and a first rotatable portion that supports the foldable portion adjacent to the first non-foldable portion;
a second metal plate disposed between the flexible display module and the case and that includes a second fixed portion that supports the second non-foldable portion and a second rotatable portion that supports the foldable portion adjacent to the second non-foldable portion;
a first hinge rotatably connected to the coupling cover and that includes a first fixed support portion that supports the first fixed portion and a first portion that supports the second rotatable portion or the first rotatable portion according to a rotation of the first cover; and
a second hinge rotatably connected to the coupling cover and that includes a second fixed support portion that supports the second fixed portion and a second portion that supports the first rotatable portion or the second rotatable portion according to a rotation of the second cover.

2. The foldable display device of claim 1,
wherein the first portion of the first hinge further includes a first non-fixed support portion spaced apart from the first fixed support portion and that supports the second rotatable portion when the flexible display module is unfolded, and
wherein the second portion of the second hinge further includes a second non-fixed support portion spaced apart from the second fixed support portion and that supports the first rotatable portion when the flexible display module is unfolded.

3. The foldable display device of claim 2,
wherein the first fixed support portion and the first non-fixed support portion are aligned on a same plane, and
wherein the second fixed support portion and the second non-fixed support portion are aligned on a same plane.

4. The foldable display device of claim 2,
wherein a width of the first fixed support portion is greater than a width of the first non-fixed support portion, and
wherein a width of the second fixed support portion is, greater than a width of the second non-fixed support portion.

5. The foldable display device of claim 2,
wherein the first portion of the first hinge further includes a first straight portion adjacent to the first fixed support portion and that supports the first rotatable portion when the flexible display module is folded, and
wherein the second portion of the second hinge further includes a second straight portion adjacent to the second fixed support portion and that supports the second rotatable portion when the flexible display module is folded.

6. The foldable display device of claim 5,
wherein the first straight portion forms an obtuse angle with the first fixed support portion, and
wherein the second straight portion forms an obtuse angle with the second fixed support portion.

7. The foldable display device of claim 5,
wherein the first portion of the first hinge further includes a first curved portion disposed between the first non-fixed support portion and the first straight portion and that is slidably and rotatably connected to the coupling cover, and
wherein the second portion of the second hinge further includes a second curved portion disposed between the second non-fixed support portion and the second straight portion and that is slidably and rotatably connected to the coupling cover.

8. The foldable display device of claim 7,
wherein the first non-fixed support portion forms an acute angle with the first curved portion, and
wherein the second non-fixed support portion forms an acute angle with the second curved portion.

9. The foldable display device of claim 7,
wherein the first straight portion forms an obtuse angle with the first curved portion, and
wherein the second straight portion forms an obtuse angle with the second curved portion.

10. The foldable display device of claim 7, wherein, when the flexible display module is unfolded, a first end of the coupling cover is positioned between the first straight portion and the first curved portion and a second end of the coupling cover is positioned between the second straight portion and the second curved portion.

11. The foldable display device of claim 7,
wherein the coupling cover includes a first coupling portion that is slidably and rotatably connected to the first curved portion and a second coupling portion that is slidably and rotatably connected to the second curved portion, and
wherein, when the flexible display module is folded, the first coupling portion of the coupling cover is positioned between the first non-fixed support portion and the first curved portion, and the second coupling portion of the coupling cover is positioned between the second non-fixed support portion and the second curved portion.

12. The foldable display device of claim 7, wherein each of a curvature of the first curved portion and a curvature of the second curved portion is greater than a curvature of the coupling cover.

13. The foldable display device of claim 1, wherein, when the flexible display module is unfolded, the first rotatable portion is collinear with the first fixed portion and the second rotatable portion is collinear with the second fixed portion, and when the flexible display module is folded, the first rotatable portion forms an obtuse angle with the first fixed portion and the second rotatable portion forms an obtuse angle with the second fixed portion.

14. The foldable display device of claim 1, wherein each of the first hinge and the second hinge has a uniform thickness, and each of the first hinge and the second hinge includes a metal.

15. The foldable display device of claim 1, further comprising:
a protective layer coupled between the first metal plate and the second metal plate and that covers the foldable portion of the flexible display module exposed between the first metal plate and the second metal plate.

16. A foldable display device, comprising:
a flexible display module that includes a first non-foldable portion, a second non-foldable portion, and a foldable portion disposed between the first non-foldable portion and the second non-foldable portion;
a case disposed on the flexible display module and that includes a first cover that covers the first non-foldable portion, a second cover that covers the second non-foldable portion, and a coupling cover that covers the foldable portion and includes a first coupling portion and a second coupling portion;
a first metal plate disposed between the flexible display module and the case and that supports the first non-foldable portion and the foldable portion adjacent to the first non-foldable portion;
a second metal plate disposed between the flexible display module and the case and that supports the second non-foldable portion and the foldable portion adjacent to the second non-foldable portion;
a first hinge slidably and rotatably connected to the first coupling portion of the coupling cover and that supports the first metal plate; and
a second hinge slidably and rotatably connected to the second coupling portion of the coupling cover and that supports the second metal plate,
wherein the first coupling portion is disposed between the first metal plate and the first hinge, and the second coupling portion is disposed between the second metal plate and the second hinge.

17. The foldable display device of claim 16,
wherein the first metal plate includes a first fixed portion that supports the first non-foldable portion and a first rotatable portion that supports the foldable portion adjacent to the first non-foldable portion, and
wherein the second metal plate includes a second fixed portion that supports the second non-foldable portion and a second rotatable portion that supports the foldable portion adjacent to the second non-foldable portion.

18. The foldable display device of claim 17, wherein the first hinge includes:
a first fixed support portion that supports the first fixed portion;
a first non-fixed support portion spaced apart from the first fixed support portion and that supports the second rotatable portion when the flexible display module is unfolded;
a first straight portion adjacent to the first fixed support portion and that supports the first rotatable portion when the flexible display module is folded; and
a first curved portion disposed between the first non-fixed support portion and the first straight portion and that is slidably and rotatably connected to the first coupling portion of the coupling cover.

19. The foldable display device of claim 17, wherein the second hinge includes:
a second fixed support portion that supporting the second fixed portion;
a second non-fixed support portion spaced apart from the second fixed support portion and that supports the first rotatable portion when the flexible display module is unfolded;
a second straight portion adjacent to the second fixed support portion and that supports the second rotatable portion when the flexible display module is folded; and
a second curved portion disposed between the second non-fixed support portion and the second straight portion and that is slidably and rotatably connected to the second coupling portion of the coupling cover.

20. A foldable display device, comprising:
a flexible display module that includes a first non-foldable portion, a second non-foldable portion, and a foldable portion disposed between the first non-foldable portion and the second non-foldable portion;
a case disposed on the flexible display module and that includes a first cover that covers the first non-foldable portion, a second cover that covers the second non-foldable portion, and a coupling cover that covers the foldable portion;
a first metal plate disposed between the flexible display module and the case and that includes a first fixed portion that supports the first non-foldable portion and a first rotatable portion that supports the foldable portion adjacent to the first non-foldable portion;
a second metal plate disposed between the flexible display module and the case and that includes a second fixed portion that supports the second non-foldable portion and a second rotatable portion that supports the foldable portion adjacent to the second non-foldable portion;
a protective layer coupled between the first metal plate and the second metal plate, wherein when the flexible display module is folded, the protective layer covers the foldable portion of the flexible display module exposed between the first metal plate and the second metal plate;
a first hinge slidably and rotatably connected to the coupling cover and that supports the first metal plate; and
a second hinge slidably and rotatably connected to the coupling cover and that supports the second metal plate,
wherein when the flexible display module is unfolded, the first metal plate is in contact with the second metal plate and the protective layer is disposed between the first and second metal plates and the first and second hinges.

21. The foldable display device of claim 20, wherein
the first hinge includes a first fixed support portion that supports the first fixed portion and a first portion that supports the second rotatable portion or the first rotatable portion according to a rotation of the first cover; and
the second hinge includes a second fixed support portion that supports the second fixed portion and a second portion that supports the first rotatable portion or the second rotatable portion according to a rotation of the second cover.

* * * * *